US011426803B2

United States Patent
Hecht (10) Patent No.: US 11,426,803 B2
(45) Date of Patent: Aug. 30, 2022

(54) REPLACEABLE CUTTING HEAD HAVING EXTERNAL THREAD WITH CONCAVELY CURVED ROOT AND ROTARY CUTTING TOOL

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 254 days.

(21) Appl. No.: 17/013,984

(22) Filed: Sep. 8, 2020

(65) Prior Publication Data

US 2022/0072636 A1 Mar. 10, 2022

(51) Int. Cl.
*B23B 31/11* (2006.01)
*B23C 5/24* (2006.01)

(52) U.S. Cl.
CPC ... *B23B 31/1122* (2013.01); *B23B 2260/1388* (2013.01); *B23C 5/2472* (2013.01); *B23C 2210/02* (2013.01); *B23C 2210/03* (2013.01)

(58) Field of Classification Search
CPC ............. B23B 31/1115; B23B 31/1122; B23B 2260/1388; B23B 2251/02; B23C 5/109; B23C 5/22; B23C 5/2472; B23C 2210/02; B23C 2210/03; B23C 5/10; B23C 2240/32; B23C 2251/02; B23C 31/11; F16B 33/02; F16B 25/0047; E21B 17/042; E21B 17/0426; Y10T 408/90993
See application file for complete search history.

(56) References Cited

U.S. PATENT DOCUMENTS 3,433,117 A 3/1969 Gowen, Jr. et al.
4,332,502 A * 6/1982 Wormald ............ E21B 17/0426
403/343

(Continued)

FOREIGN PATENT DOCUMENTS

CN 106837972 A 6/2017
WO WO-2013146882 A1 * 10/2013 ......... B23B 31/1122

OTHER PUBLICATIONS

International Search Report dated Dec. 8, 2021, issued in PCT counterpart application (No. PCT/IL2021/050934).

(Continued)

*Primary Examiner* — Eric A. Gates
*Assistant Examiner* — Paul M Janeski
(74) *Attorney, Agent, or Firm* — Womble Bond Dickinson (US) LLP (57) ABSTRACT

A rotary cutting tool includes a replaceable cutting head and a tool holder. The replaceable cutting head includes a forward cutting portion and a rearward mounting portion. The mounting portion includes a male coupling member that includes an external thread defined by external inner and outer cylinders. The external thread has concavely curved external thread roots which each merge with a respective straight external loaded surface at a first external root point. The first external root point is spaced apart from the external inner cylinder by a first external radial distance. The first external radial distance is greater than a third and less than two thirds of the external thread height. The tool holder includes a female coupling member that includes an internal thread. When the rotary cutting tool is in a locked position, the external thread is threadingly engaged with the internal thread.

30 Claims, 5 Drawing Sheets

(56) References Cited

U.S. PATENT DOCUMENTS

| | | | |
|---|---|---|---|
| 4,549,754 A | 10/1985 | Saunders et al. | |
| 4,799,844 A | 1/1989 | Chuang | |
| 5,056,611 A * | 10/1991 | Yousef | F16B 33/02 411/366.3 |
| 5,060,740 A | 10/1991 | Yousef et al. | |
| 5,163,523 A * | 11/1992 | Yousef | E21B 17/0426 175/320 |
| 6,196,598 B1 | 3/2001 | Yao | |
| 6,485,220 B2 | 11/2002 | Hecht | |
| 7,210,710 B2 * | 5/2007 | Williamson | E21B 17/042 285/333 |
| 7,374,376 B2 | 5/2008 | Jonsson et al. | |
| 7,611,311 B2 | 11/2009 | Kakai et al. | |
| 7,713,004 B2 | 5/2010 | Lehto et al. | |
| 7,997,842 B2 | 8/2011 | Diekmeyer | |
| 8,226,333 B2 | 7/2012 | Kakai et al. | |
| 8,262,139 B2 * | 9/2012 | Nava | E21B 17/0426 285/390 |
| 9,611,694 B2 * | 4/2017 | Beronius | F16B 33/02 |
| 9,874,058 B2 | 1/2018 | Benedict | |
| 2001/0041089 A1 * | 11/2001 | Hecht | F16B 33/02 403/343 |
| 2006/0072977 A1 * | 4/2006 | Jonsson | B23B 31/1115 408/233 |
| 2006/0073744 A1 * | 4/2006 | Jonsson | B23B 31/1107 407/34 |
| 2006/0089976 A1 * | 4/2006 | Breihan | F16L 15/001 709/218 |
| 2007/0116539 A1 * | 5/2007 | Malik | B23B 31/11 411/386 |
| 2007/0196188 A1 * | 8/2007 | Hecht | B23B 31/1122 408/233 |
| 2007/0248421 A1 * | 10/2007 | Kakai | B23C 5/10 407/34 |
| 2008/0304923 A1 * | 12/2008 | Lehto | B23B 31/1115 407/100 |
| 2013/0272806 A1 * | 10/2013 | Guay | B23C 5/109 29/527.1 |
| 2015/0016905 A1 | 1/2015 | Haimer | |
| 2015/0030399 A1 | 1/2015 | Frota De Souza et al. | |
| 2015/0063928 A1 | 3/2015 | Maeda et al. | |
| 2015/0217380 A1 * | 8/2015 | Haimer | B23C 5/1009 407/54 |
| 2015/0314379 A1 * | 11/2015 | Sharivker | B23B 31/1115 407/53 |
| 2015/0360295 A1 * | 12/2015 | Haimer | B23B 31/1115 279/20 |
| 2017/0043410 A1 * | 2/2017 | Hecht | B23B 31/1115 |
| 2017/0266738 A1 | 9/2017 | Guy | |
| 2017/0291230 A1 * | 10/2017 | Harpaz | B23C 5/28 |
| 2019/0126365 A1 | 5/2019 | Osawa et al. | |

OTHER PUBLICATIONS

Written Opinion dated Dec. 8, 2021, issued in PCT counterpart application (No. PCT/IL2021/050934).

* cited by examiner

REPLACEABLE CUTTING HEAD HAVING EXTERNAL THREAD WITH CONCAVELY CURVED ROOT AND ROTARY CUTTING TOOL

FIELD OF THE INVENTION

The subject matter of the present application relates to rotary cutting tools of the type in which a replaceable cutting head, having a male coupling member, is removably retained in a female coupling member, of a tool holder, by means of a threaded coupling mechanism.

BACKGROUND OF THE INVENTION

Rotary cutting tools can be provided with a threaded coupling mechanism, or "tool joint", for securely retaining a replaceable cutting head within a tool holder.

The replaceable cutting head can include a male coupling member and the tool holder can include a female coupling member. The male coupling member can include an external thread. The female coupling member can include an internal thread that corresponds to the external thread on the male coupling member.

The external threads have external loaded surfaces for abutting corresponding surface on the internal thread. The external loaded surfaces are typically straight. The external threads have external roots which merge with a respective external loaded surface.

In some such rotary cutting tools, the external roots are substantially straight and have a small radius where they merge with the respective external loaded surface. An example of such a rotary cutting tool is disclosed in, for example, U.S. Pat. No. 6,485,220. A disadvantage of such external threads is that they are prone to stress fracture in the region where the external roots adjoin the respective external loaded surface (i.e. at the small radius).

In other such rotary cutting tools, in order to overcome such a problem, the roots are elliptical. Examples of such a rotary cutting tool are disclosed in, for example, U.S. Pat. Nos. 4,799,844 and 5,060,740.

In yet other such rotary cutting tools, the external threads have roots defined by one or more radii. Examples of such a rotary cutting tool is disclosed in U.S. Pat. Nos. 4,549,754, 6,196,598 B1, 7,997,842 B2 and 9,874,058 B2.

It is an object of the subject matter of the present application to provide a replaceable cutting head having an external thread with improved stress reduction.

It is an object of the subject matter of the present application to provide a replaceable cutting head having an external thread with improved distribution of stress concentration.

SUMMARY OF THE INVENTION

In accordance with a first aspect of the subject matter of the present application there is provided a replaceable cutting head, having a head longitudinal axis extending in a forward to rearward direction, comprising
a forward portion forming a cutting portion comprising at least one cutting edge; and
a rearward portion forming a mounting portion, the mounting portion comprising a male coupling member having an external thread and protruding rearwardly from a head base surface, the head base surface extending transversely with respect to the head longitudinal axis, and defining a boundary between the cutting portion and the mounting portion, wherein:
the external thread comprises an external thread ridge extending helically about an external thread axis and comprising forward and rearward external flank surfaces and an external top surface extending therebetween;
the forward and rearward external flank surfaces generally face in opposite axial directions and delimit a helical external thread groove that comprises an external bottom surface;
the external thread has a constant external thread pitch;
the external thread has a constant external thread height;
the external thread of the male coupling member is a straight thread defined by external inner and outer cylinders, the external inner cylinder having a minor thread diameter and the external outer cylinder having a major thread diameter, and
in a cross-sectional view taken in an axial plane containing the external thread axis:
the forward and rearward external flank surfaces form a plurality of straight external loaded surfaces and a plurality of external non-loaded surfaces respectively;
the external bottom surface forms a plurality of concavely curved external thread roots, each external thread root extending between first and second external root points and merging with a respective external loaded surface at the first external root point, the first external root point is spaced apart from the external inner cylinder by a first external radial distance; and
the first external radial distance is greater than a third of the external thread height $H_E$ and less than two thirds of the external thread height $H_E$.

In accordance with a second aspect of the subject matter of the present application there is provided a rotary cutting tool having a longitudinal axis and extending in a forward to rearward direction, comprising:
a tool holder having a holder longitudinal axis and a replaceable cutting head of the type described above threadingly engaged to the tool holder.

It is understood that the above-said is a summary, and that features described hereinafter may be applicable in any combination to the subject matter of the present application, for example, any of the following features may be applicable to the replaceable cutting head or the rotary cutting tool:

The first external radial distance can be greater than five twelfths of the external thread height $H_E$ and less than seven twelfths of the external thread height.

Each external loaded surface can have an external loaded surface length measured along contour thereof. Each external thread root can have an external thread root length measured along the contour thereof between the first and second external root points. The external thread root length can be between three and six times greater than the external loaded surface length.

The minor thread diameter can be at least 75% of the major thread diameter.

The external thread can have between three and four turns in the axial direction.

The external thread can be a single start thread.

The external thread height can be greater than a third of the external thread pitch and less than half of the external thread pitch.

Each external thread root can be defined by a single external root radius.

The external root radius can be greater than or equal to 0.3 mm and less than or equal to 0.5 mm.

The first and second external root points can subtend an external root subtend angle at the circle center of an imaginary circle defined by the external root radius. The external root subtend angle θ can be greater than or equal to 90° and less than or equal to 160°.

The external non-loaded surfaces can be straight. Each external thread root can merge tangentially with a respective external non-loaded surface at the second external root point. The external root subtend angle θ can be greater than or equal to 120° and less than or equal to 140°.

The external root radius can be greater than a third of the external thread pitch and less than half of the external thread pitch.

Each external thread root can merge tangentially with the respective external loaded surface.

Each external thread root can merge with a respective external non-loaded surface at the second external root point.

The external non-loaded surfaces can be straight.

Each external thread root can merge tangentially with the respective external non-loaded surface.

The first and second external root points can be spaced apart in an axial direction by a point distance, the point distance can be greater than a third of the external thread pitch PE and less than half of the external thread pitch.

The external loaded surfaces can be inclined at an external flank angle with respect to a head radial plane perpendicular to the external thread axis. The external flank angle is in the range of 28°<α<34°.

In said cross-sectional view taken in an axial plane containing the external thread axis, the external top surface can form a plurality of external thread crests each comprising a radially outermost external crest surface, the radially outermost external crest surfaces can be parallel to the external thread axis and co-linear with each other.

In said cross-sectional view taken in an axial plane containing the external thread axis, each straight external loaded surface can have an external loaded surface height measured perpendicular to the external thread axis. The external loaded surface height can be greater than a third of the external thread height $H_E$ and less than three-fifths of the external thread height.

The replaceable cutting head can be made from a first material. The tool holder can be made from a second material. The first material can be harder than the second material.

The tool holder can have a female coupling member having an internal thread extending rearwardly from a holder forward surface, the holder forward surface extending transversely with respect to the holder longitudinal axis. The rotary cutting tool can be adjustable between: a released position in which the internal and external threads may not be threadingly engaged to one another, and a locked position in which the male coupling member can be removably retained in the female coupling member with the internal and external threads threadingly engaged to one another.

The internal thread of the female coupling member can be a straight thread defined by internal inner and outer cylinders.

The internal thread can have a constant internal thread pitch which can be the same as the external thread pitch.

The internal thread can comprise an internal thread ridge, extending helically about an internal thread axis, and comprising forward and rearward internal flank surfaces and an internal top surface extending therebetween. The forward and rearward internal flank surfaces can generally face in opposite axial directions and delimit a helical internal thread groove that comprises an internal bottom surface. The forward external flank surface and the forward internal flank surface can face in the forward direction. The rearward external flank surface and the rearward internal flank surface can face in the rearward direction. In the locked position, the rearward internal flank surface can abut the forward external flank surface.

In the locked position, the forward internal flank surface can be spaced apart from the rearward external flank surface. The internal top surface can be spaced apart from the external bottom surface. The internal bottom surface can be spaced apart from the external top surface.

In a cross-sectional view taken in an axial plane containing the internal thread axis, the forward and rearward internal flank surfaces can form a plurality of internal non-loaded surfaces and a plurality of internal loaded surfaces respectively, the internal loaded surfaces can be straight.

The internal top surface can form a plurality of internal thread crests, each of the plurality of internal thread crests comprising a radially innermost internal crest surface which can be parallel to the internal thread axis, the radially innermost internal crest surfaces can be co-linear with each other.

Each of the plurality of internal thread crests can comprise a relieved internal crest surface extending between a respective radially innermost internal crest surface and a respective internal loaded surface. Each relieved internal crest surface can be oriented transversely with respect to the respective radially innermost internal crest surface and the respective internal loaded surface.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where consid-

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
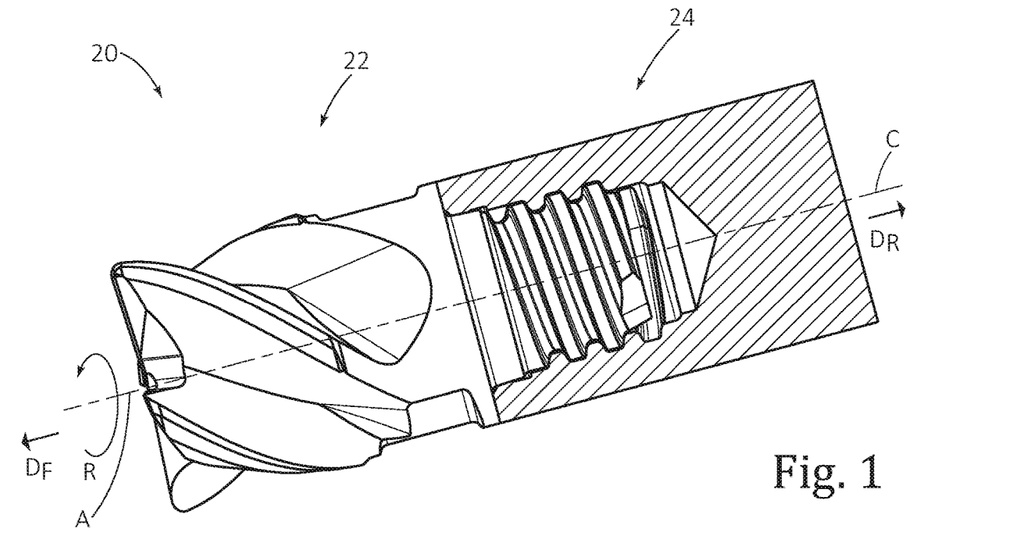
FIG. 1 is a perspective longitudinal cross-sectional view of a rotary cutting tool.
Figure 2:
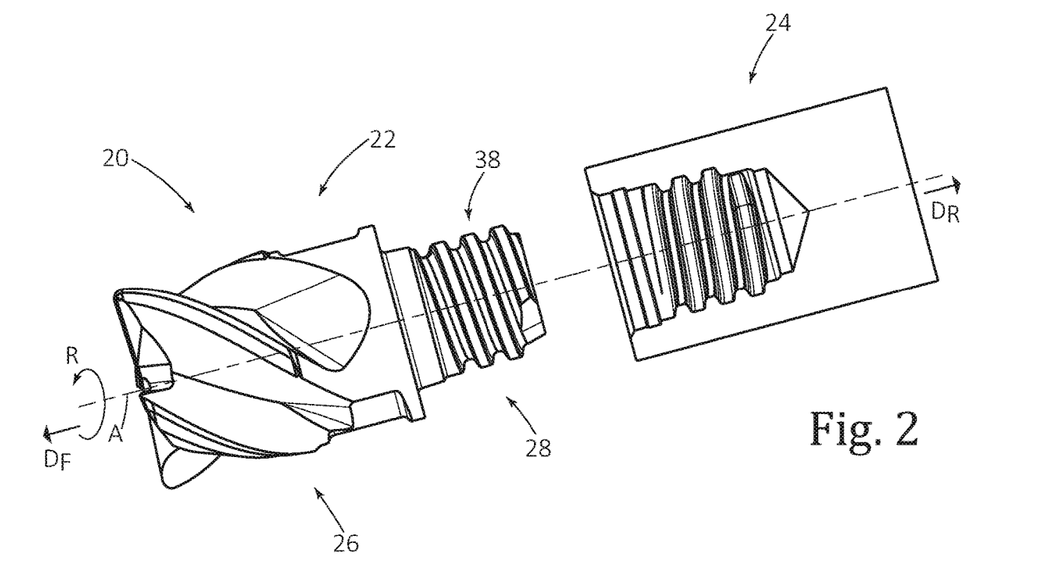
FIG. 2 is an exploded perspective longitudinal cross-sectional view of the rotary cutting tool shown in FIG. 1.

Attention is first drawn to FIGS. 1 and 2 showing a rotary cutting tool 20 of the type used for milling operations, specifically end milling, in accordance with embodiments of the subject matter of the present application. The rotary cutting tool 20 has a tool longitudinal axis L around which the tool rotates in a direction of rotation R when performing metal cutting operations.

The rotary cutting tool 20 includes a replaceable cutting head 22 that has a head longitudinal axis A, around which the replaceable cutting head 22 rotates in the direction of rotation R. The head longitudinal axis A extends in the forward $D_F$ to rearward direction $D_R$. The replaceable cutting head 22 is made from a first material. The first material can be cemented carbide.

The rotary cutting tool 20 also includes a tool holder 24 having a holder longitudinal axis C. The tool holder 24 is made from a second material. The second material can be harder than the first material. The second material can be steel. The replaceable cutting head 22 can be removably retained in the tool holder 24 by means of a threaded coupling mechanism. Such a threaded coupling mechanism could possibly be advantageous for other types of rotary cutting operations than that stated hereinabove, such as, for example, reaming or drilling.

It should be appreciated that use of the terms "forward" and "rearward" throughout the description and claims refer to a relative position of the replaceable cutting head 22 to the tool holder 24 of the assembled rotary cutting tool 20, as seen in FIG. 1. The terms "forward" and "rearward" may also be applied in a direction of the head longitudinal axis A towards the left and right, respectively, in FIGS. 3 and 4, and also in a direction of holder longitudinal axis C towards the left and right, respectively, in FIGS. 6 and 7. It is understood that the tool holder 24 also extends along its own forward to rearward direction along the holder longitudinal axis C.

Figure 3:
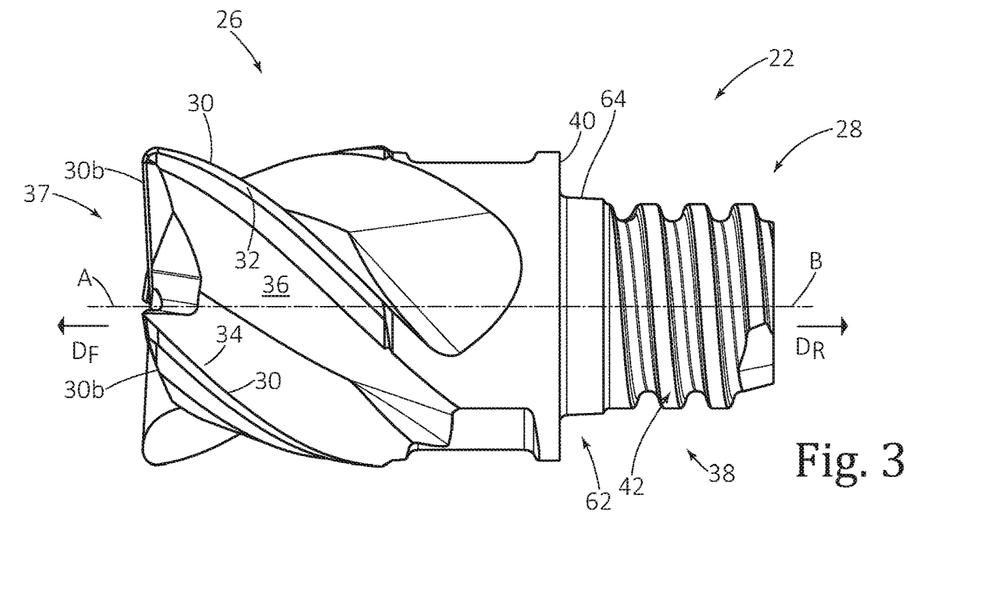
FIG. 3 is a side view of a replaceable cutting head shown in FIGS. 1 and 2.
Figure 4:
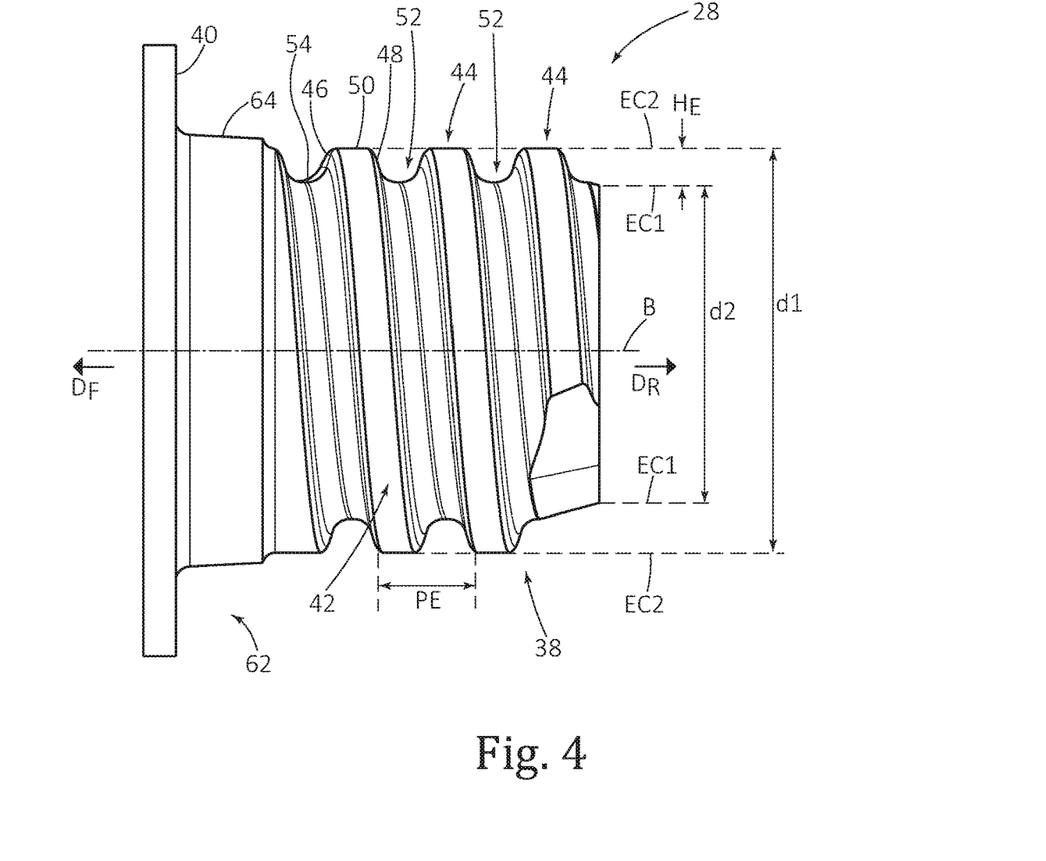
FIG. 4 is a detail of FIG. 3.
Figure 5:
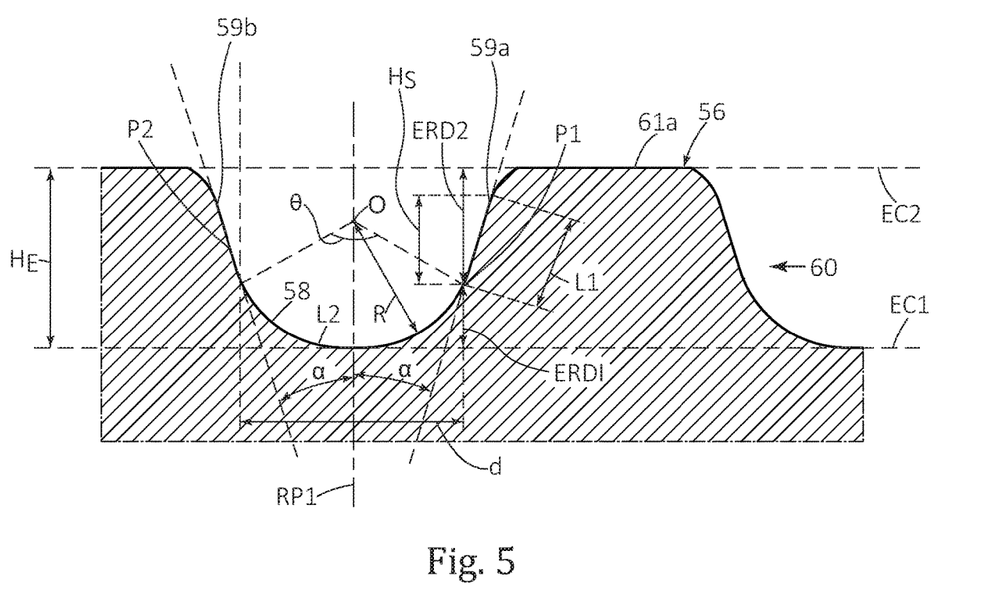
FIG. 5 is a partial longitudinal cross-sectional view of a male coupling member shown in FIG. 4.

Reference is now made to FIGS. 3 to 5. The replaceable cutting head 22 has a forward portion that forms a cutting portion 26 and a rearward portion that forms a mounting portion 28. In accordance with some embodiments of the subject matter of the present application the replaceable cutting head 22 can be formed to have unitary integral one-piece construction. This provides an advantage in that the replaceable cutting head 22 has no detachable cutting inserts (not shown).

Referring to FIG. 3, the cutting portion 26 includes at least one cutting edge 30, 30b. In this non-limiting example shown in the drawings the at least one cutting edge 30, 30b can include exactly four peripheral cutting edges. Each peripheral cutting edge 30 is formed at the intersection of a peripheral relief surface 32, and a peripheral rake surface 34. The peripheral relief surface 32 is located rotationally behind the peripheral cutting edge 30 and the peripheral rake surface 34 is located rotationally ahead of the peripheral cutting edge 30, both in respect to the direction of rotation R. The orientation of the peripheral cutting edge 30 allows metal cutting operations to be performed.

In accordance with some embodiments of the subject matter of the present application, the cutting portion 26 can include at least one flute 36 for evacuating chips (not shown) that are produced during the cutting operation. One flute 36 is associated with each peripheral cutting edge 30. The at least one cutting edge 30, 30b can include one or more end cutting edges 30b at an end face 37 of the cutting portion 26. In this non-limiting example shown in the drawings, the at least one cutting edge 30, 30b can include exactly four end cutting edges 30b.

Making reference now to FIGS. 3 and 4, the mounting portion 28 includes a male coupling member 38 that protrudes rearwardly from a head base surface 40. The head base surface 40 extends transversely with respect to the head longitudinal axis A and defines a boundary between the cutting portion 26 and the mounting portion 28. That is to say, the cutting portion 26 is formed forward of the head base surface 40 and the mounting portion 28 is formed rearward of the head base surface 40. In accordance with some embodiments of the subject matter of the present application the male coupling member 38 can be rigid. The head base surface 40 can be perpendicular to the head longitudinal axis A. The head base surface 40 is intended to abut a corresponding surface 70 (described further below) on the tool holder 24 when the rotary cutting tool 20 is in a locked position, as will be described hereinafter.

The male coupling member 38 includes an external (male) thread 42. Referring to FIG. 3, the external thread 42 includes an external thread ridge 44 that extends helically about an external thread axis B. The external thread axis B is co-incident with the head longitudinal axis A. Thus, the external thread portion 42 and the replaceable cutting head 22 are co-axial. Referring to FIG. 4, the external thread ridge 44 includes forward and rearward external flank surfaces 46, 48 and an external top surface 50 that extends therebetween. The forward and rearward external flank surfaces 46, 48 face in opposite axial directions $D_F$, $D_R$, with the forward external flank surface 46 facing in the forward direction $D_F$ and the rearward external flank surface 48 facing in the rearward direction $D_R$. The forward and rearward external flank surfaces 46, 48 delimit an external thread groove 52. The external thread groove 52 extends helically about the external thread axis B and includes an external bottom surface 54. The external thread 42 has an external thread pitch PE. The external thread pitch PE is constant.

As shown in FIG. 4, in a cross-sectional view taken in an axial plane (that is, a plane that contains the external thread axis B) the external top surface 50 forms a plurality of external thread crests 56 and the external bottom surface 54 forms a plurality of external thread roots 58.

In the same cross-sectional view, the forward and rearward external flank surfaces 46, 48 form a plurality of external loaded surfaces 59a and a plurality of external non-loaded surfaces 59b, respectively. The external loaded surfaces 59a serve the purpose to contact a corresponding surface on an internal (female) thread. The external loaded surfaces 59a are straight. Each external loaded surface 59a has an external loaded surface length L1 measured along the contour of external loaded surface 59a. Each external loaded surface 59a has an external loaded surface height $H_S$ measured perpendicular to the external thread axis B. In accordance with some embodiments of the subject matter of the present application, the external loaded surfaces 59a can be inclined at an external flank angle α with respect to a head radial plane RP1 perpendicular to the external thread axis B. Preferably, the external flank angle α can be between 28°-34°, and more preferably is 31°. The external non-loaded surfaces 59b can be straight. The external non-loaded surfaces 59b can be inclined to the head radial plane RP1 at the same flank angle α as the external loaded surfaces 59a (but reflected about the head radial plane RP1). The external thread 42 defines an external thread form 60.

In accordance with some embodiments of the subject matter of the present application, the external thread 42 is a straight thread. It should be appreciated that the term "straight thread" throughout the description and claims relates to a thread where the thread ridge and thread groove extends about a respective cylinder and thus all the thread crests 56, 88 are equidistant from the thread axis, as are all the thread roots 58, 90. Thus, in a straight thread, both thread diameters (the thread major diameter $d_1$ of external thread ridge 44, and the thread minor diameter $d_2$ of the external thread groove 52) are constant in the rearward direction $D_F$ of the cutting head 22. Such a straight thread may be formed by threading the hollow forward end of a cylindrical steel rod with an external turning insert. As the steel rod rotates and moves in the axial direction to form the external thread it does not move radially away from the 'static' cutting insert so that the thread has a cylindrical configuration. Specifically, the thread groove extends about an external inner cylinder EC1 defined by the points where the external bottom surface 54 are closest to the external thread axis B. The external thread ridge extends about an external outer cylinder EC2 defined by the points where the external top surface 50 are furthest from the external thread axis B. The external inner and outer cylinders EC1, EC2 have the external thread axis B as their respective axes.

The plurality of external thread crests 56 define the thread major diameter (corresponding to external outer cylinder EC2) and the plurality of external thread roots 58 define the thread minor diameter (associated with external inner cylinder EC1) of the external thread 42, respectively. The major diameter minus the minor diameter, divided by two, equals the external thread height $H_E$ of the external thread 42. The external thread height $H_E$ is constant. In accordance with some embodiments of the subject matter of the present application, the minor thread diameter $d_2$ of the external thread groove 52 can be at least 75% of the major thread diameter $d_1$ of external thread ridge 44. Thus, the overall strength and rigidity of the external thread 42 is not detrimentally affected. The external thread height $H_E$ can be greater than a third of the external thread pitch PE. The external thread height $H_E$ can be less than half of the external thread pitch PE. The external loaded surface height $H_S$ can be greater than a third of the external thread height $H_E$. The external loaded surface height $H_S$ can be less than three-fifths of the external thread height $H_E$.

In accordance with some embodiments of the subject matter of the present application, the external thread 42 can have between three and four turns in the axial direction. Advantageously, this permits the cutting head 22 to be manufactured with less material than other cutting heads (not shown) having more turns. The external thread 42 can be a single start thread.

In a cross-sectional view taken in an axial plane containing the external thread axis B, each external thread root 58 is concavely curved. That is to say, each external thread root 58 curves inwardly. Advantageously such a configuration reduces stress at the external thread root 58. Each external thread root 58 extends between first and second external root points P1, P2. The first and second external root points P1, P2 are the points on the external thread form 60 at which opposing extremities of each concavely curved external thread root 58 terminate and transition into adjacent non-concavely curved external loaded and non-load surfaces 59a, 59b, respectively. The first and second external root points P1, P2 are further from the external thread axis B than a mid-portion of the external thread root 58. Each external thread root 58 has an external thread root length L2 measured along the contour of the external thread root 58 between the first and second external root points P1, P2. In accordance with some embodiments of the subject matter of the present application, the external thread root length L2 can be greater than the external loaded surface length L1. In particular, the external thread root length L2 can be between three and six times greater than the external loaded surface length L1.

Reference is made in particular to FIG. 5. Each external thread root 58 merges with a respective external loaded surface 59a at the first external root point P1. The first external root point P1 is spaced apart from the external inner cylinder EC1 by a first external radial distance ERD1. The first external root point P1 is spaced apart from the external outer cylinder EC2 by a second external radial distance ERD2. The sum of the first external radial distance ERD1 and the second external radial distance ERD2 is equal to the external thread height $H_E$. The first external radial distance ERD1 is greater than a third of the external thread height $H_E$ and less than two thirds of the external thread height $H_E$. Advantageously, combined with the concavely curved root, this provides a reduction of stress at the external thread root, thereby increasing tool life, while at the same time providing sufficient contact area between the external and internal loaded surface 59a, 91a for a secure threaded coupling. Further advantageously, this configuration provides enlarged clearance to allow threaded engagement with an internal thread having increased height. Preferably, in accordance with some embodiments of the subject matter of the present application, the first external radial distance ERD1 can be greater than five twelfths of the external thread height $H_E$ and less than seven twelfths of the external thread height $H_E$.

In accordance with some embodiments of the subject matter of the present application, in a cross-sectional view taken in an axial plane containing the external thread axis B, the first and second external root points P1, P2 can be spaced apart in an axial direction by a point distance d. The point distance d can be greater than a third of the external thread pitch PE. The point distance d can be less than half of the external thread pitch PE.

In accordance with some embodiments of the subject matter of the present application, the first external radial distance ERD1 can be less than the second external radial distance ERD2. Stated differently, the first external root point P1 is further from the external outer cylinder EC2 than from the external inner cylinder EC1. Each external thread root 58 can merge tangentially with the respective external loaded surface 59a. Each external thread root 58 can merge with a respective external non-loaded surface 59b at the second external root point P2. In such a configuration, each external thread root 58 extends between one of the external loaded surfaces 59a and one of the external non-loaded surfaces 59b. In the configuration where the external non-loaded surfaces (59b) are straight, each external thread root 58 can merge tangentially with the respective external non-loaded surface 59b.

In accordance with some embodiments of the subject matter of the present application, each external thread root 58 can be defined by a single external root radius R. Advantageously, this provides an improved distribution of stress at the external thread root 58. Further advantageously, such cutting heads 22 are easier to manufacture. The external root radius R can be greater than or equal to 0.3 mm. The external root radius R can be less than or equal to 0.5 mm. The first and second external root points P1, P2 can subtend an external root subtend angle θ at the circle center O of an imaginary circle defined by the external root radius R. The external root subtend angle θ can be greater than or equal to 90° and less than or equal to 160°. The external root radius R can be greater than a third of the external thread pitch PE. The external root radius R can be less than half of the external thread pitch PE. In the configuration where the external non-loaded surfaces (59b) are straight and each external thread root 58 merges tangentially with a respective external non-loaded surface 59b at the second external root point P2, the external root subtend angle θ can be greater than or equal to 120° and less than or equal to 140°.

In accordance with some embodiments of the subject matter of the present application, the plurality of external thread crests 56 each include a radially outermost external crest surface 61a. The radially outermost external crest surfaces 61a can be parallel to the external thread axis B and co-linear with each other. Thus, a radially outermost portion of the external top surface 50 can lie on the external outer cylinder EC2.

As shown in FIGS. 3 and 4, the male coupling member 38 includes a forward bearing portion 62. The forward bearing portion 50 is located on the forward side of the external thread 42. The forward bearing portion 62 includes a forward head abutment surface 64 that tapers radially inwardly towards the head longitudinal axis A in a rearward direction $D_R$. That is to say, the forward head abutment surface 64 has a conical shape facing radially outwards. It is noted that the forward head abutment surface 64 is intended to abut a corresponding surface 94 (described further below) on the tool holder 24 when the rotary cutting tool 20 is in a locked position, as will be described hereinafter.

Figure 7:
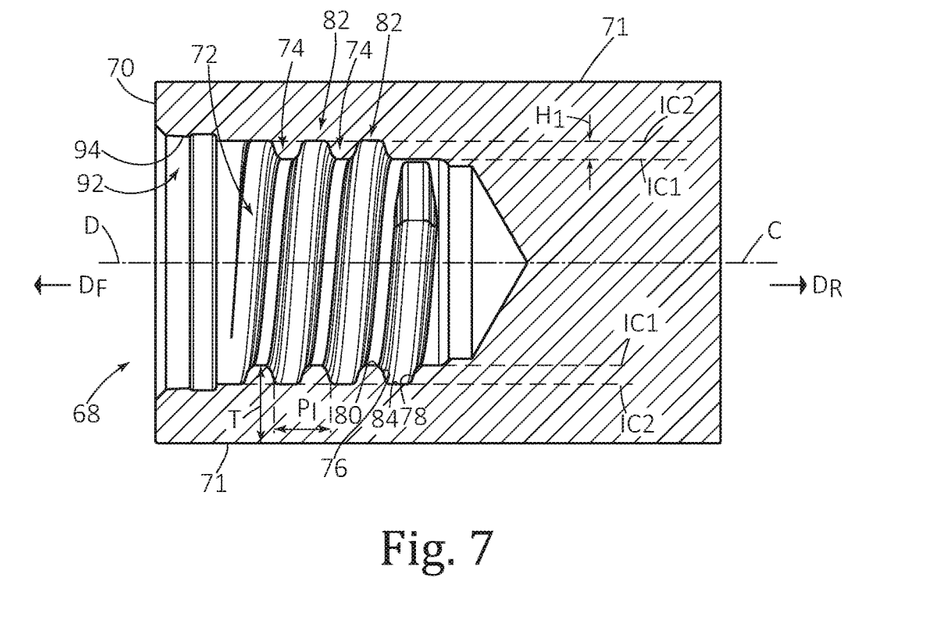
FIG. 7 is a longitudinal cross-sectional view of a female coupling member shown in FIG. 6.

It should be appreciated that use of the terms "radially inward/inwardly" and "radially outward/outwardly" throughout the description and claims refer to a relative position in a perpendicular direction in relation to the head longitudinal axis A and/or holder longitudinal axis C, towards and away from the respective axis, in FIGS. 3 to 4 and FIG. 7.

Figure 6:
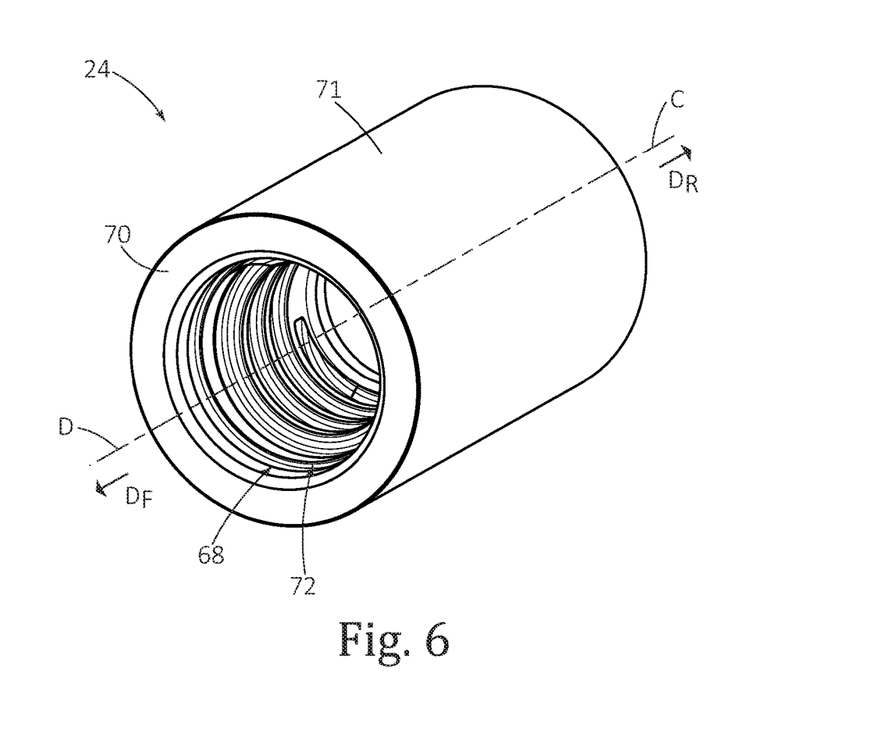
FIG. 6 is a perspective view of a tool holder shown in FIGS. 1 and 2.
Figure 8:
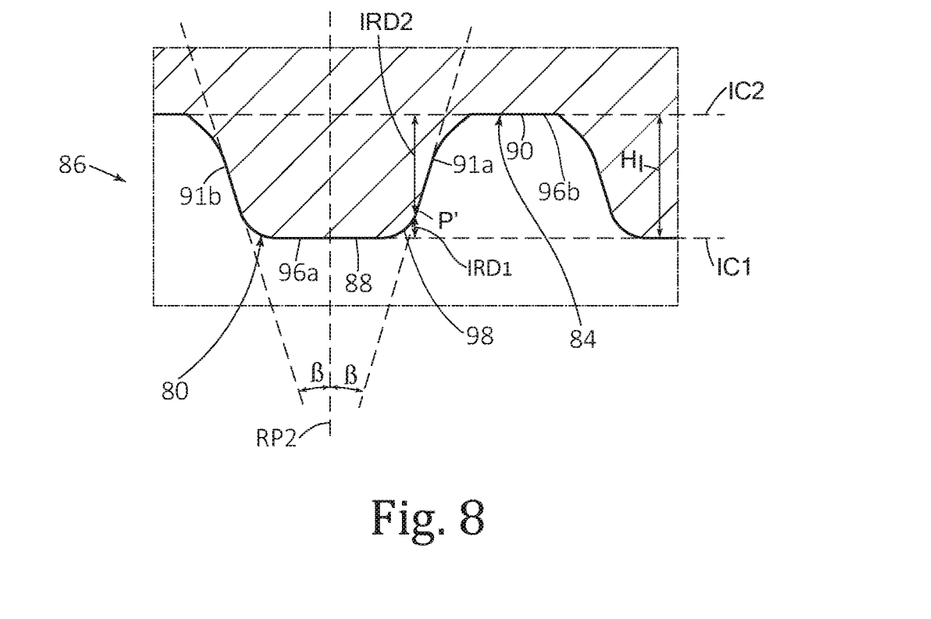
FIG. 8 is a detail of FIG. 7.

Referring now to FIGS. 6 to 8, the tool holder 24 has a holder longitudinal axis C that extends in the forward $D_F$ to rearward direction $D_R$. The tool holder 24 includes a holder peripheral surface 71 which extends about the holder longitudinal axis C. The tool holder 24 includes a female coupling member 68 that extends rearwardly from a holder forward surface 70. The holder forward surface 70 extends transversely with respect to the holder longitudinal axis C. In accordance with some embodiments of the subject matter of the present application the holder forward surface 70 can be perpendicular to the holder longitudinal axis C.

The female coupling member 68 includes an internal (female) thread 72. As shown in a longitudinal cross-sectional view of the female coupling member 68 containing the internal thread axis D (i.e. FIG. 7), the internal thread 72 includes an internal thread ridge 74 that extends helically about an internal thread axis D. The internal thread axis D is co-incident with the holder longitudinal axis C. Thus, the internal thread 72 is co-axial with the tool holder 24. The internal thread ridge 74 includes forward and rearward internal flank surfaces 76, 78 and an internal top surface 80 that extends therebetween. The forward and rearward internal flank surfaces 76, 78 face in opposite axial directions $D_F$, $D_R$, with the forward internal flank surface 76 facing in the forward direction $D_F$ and the rearward internal flank surface 78 facing in the rearward direction $D_R$. The forward and rearward internal flank surfaces 76, 78 delimit an internal thread groove 82. The internal thread 72 has an internal thread pitch PI. In accordance with some embodiments of the subject matter of the present application, the internal thread pitch PI can be constant. The internal thread pitch PI can be same as the external thread pitch PE.

The internal thread groove 82 extends helically about the internal thread axis D and includes an internal bottom surface 84. In a cross-sectional view taken in an axial plane (that is, a plane that contains the internal thread axis D) the internal top surface 80 forms a plurality of internal thread crests 88 and the internal bottom surface 84 forms a plurality of internal thread roots 90. The tool holder 24 has a holder thickness T measured in a radial direction between the holder peripheral surface 71 and the internal top surface 80.

Reference is made in particular to FIGS. 7 and 8. In a cross-sectional view taken in an axial plane containing the internal thread axis D (i.e. FIG. 7), the forward and rearward internal flank surfaces 76, 78 form a plurality of internal loaded surfaces 91a and a plurality of internal non-loaded surfaces 91b, respectively. In accordance with some embodiments of the subject matter of the present application, the internal loaded surfaces 91a can be straight. The internal loaded surfaces 91a can be inclined at an internal flank angle β with respect to a holder radial plane RP2 perpendicular to the internal thread axis D. Preferably, the internal flank angle β can be 31°. The internal flank angle β can have the same value as the external flank angle α so that a continuous surface to surface abutment can be realized between internal and external loaded surface 91a, 59a. The internal non-loaded surfaces 91b can be straight. The internal non-loaded surfaces 91b can be inclined in an identical fashion to the internal loaded surfaces 91a (but reflected about the holder radial plane RP2). The internal thread 72 defines an internal thread form 86.

In accordance with some embodiments of the subject matter of the present application, the internal thread 72 can be a straight thread. Specifically, the internal thread ridge 74 extends about an internal inner cylinder IC1 defined by the points where the internal top surface 80 are closest to the internal thread axis D. The internal thread groove 82 extends about an internal outer cylinder IC2 defined by the points where the internal bottom surface 84 internal thread axis D. The internal inner and outer cylinders IC1, IC2 have the internal thread axis D as their respective axes.

The plurality of internal thread crests 88 define the minor diameter (corresponding to internal inner cylinder IC1) and the plurality of internal thread roots 90 define the major diameter (associated with internal outer cylinder IC2) of the internal thread 72, respectively. The major diameter minus the minor diameter, divided by two, equals the internal thread height $H_I$ of the internal thread 72. The internal thread height $H_I$ can be constant. The internal thread height $H_I$ can be greater than a third of the internal thread pitch PI. The internal thread height $H_I$ can be less than half of the internal thread pitch PI.

In accordance with some embodiments of the subject matter of the present application, the internal thread 72 can have between three and four turns in the axial direction. The internal thread 72 can be a single start thread.

In accordance with some embodiments of the subject matter of the present application, the plurality of internal thread crests 88 can each include a radially innermost internal crest surface 96a. The radially innermost internal crest surfaces 96a can be parallel to the internal thread axis D and co-linear with each other. Thus, a radially innermost portion of the internal top surface 80 can lie on the internal inner cylinder IC1. The plurality of internal thread roots 90 can each include a radially outermost internal root surface 96b. The radially outermost internal root surface 96b can be parallel to the internal thread axis D and co-linear with each other. Thus, a radially outermost portion of the internal bottom surface 84 can lie on the internal outer cylinder IC2.

In accordance with some embodiments of the subject matter of the present application, each of the plurality of internal thread crests 88 can include a relieved internal crest surface 98 extending between a respective radially innermost internal crest surface 96a and a respective internal loaded surface 91a. In a longitudinal cross-sectional view of the female coupling member 68 containing the internal thread axis D (i.e. FIG. 8), each relieved internal root surface 98 can be oriented transversely with respect to the respective radially outermost internal root surface 96a and the respective internal loaded surface 91a. The relieved internal crest surface 98 can merge with the respective internal loaded surface 91a at an internal crest point P'. The internal crest point P' is spaced apart from the internal inner cylinder IC1 by a first internal radial distance IRD1. The internal crest point P' is spaced apart from the internal outer cylinder IC2 by a second internal radial distance IRD2. The sum of the first internal radial distance IRD1 and the second internal radial distance IRD2 is equal to the internal thread height $H_I$. The first internal radial distance IRD1 is greater than a quarter of the internal thread height $H_I$ and less than a half of the internal thread height $H_I$. By increasing the internal thread height $H_I$, the holder thickness T is also increased. It has been found that increased holder thickness reduces stress at the internal thread root 90.

As shown in FIGS. 6 and 7, the female coupling member 68 includes a forward supporting portion 92 The forward supporting portion 92 is located on the forward side of the internal thread 72. The forward supporting portion 92 includes a forward holder abutment surface 94 that tapers radially inwardly towards the holder longitudinal axis C in a rearward direction $D_R$. That is to say, the forward holder abutment surface 94 has a conical shape facing radially inwards. The forward holder abutment surface 94 is configured and dimensioned to be complementary to the forward head abutment surface 64 discussed above.

Assembly of the rotary cutting tool 20 is known, for example, from U.S. Pat. No. 6,485,220 B2, which is hereby incorporated by reference in its entirety. It is noted that the rotary cutting tool 20 is adjustable between a released position and a locked (or assembled) position.

To adjust the rotary cutting tool 20 to the locked position the external thread 42 is screwed (i.e. turned) into the internal thread 72.

Figure 9:
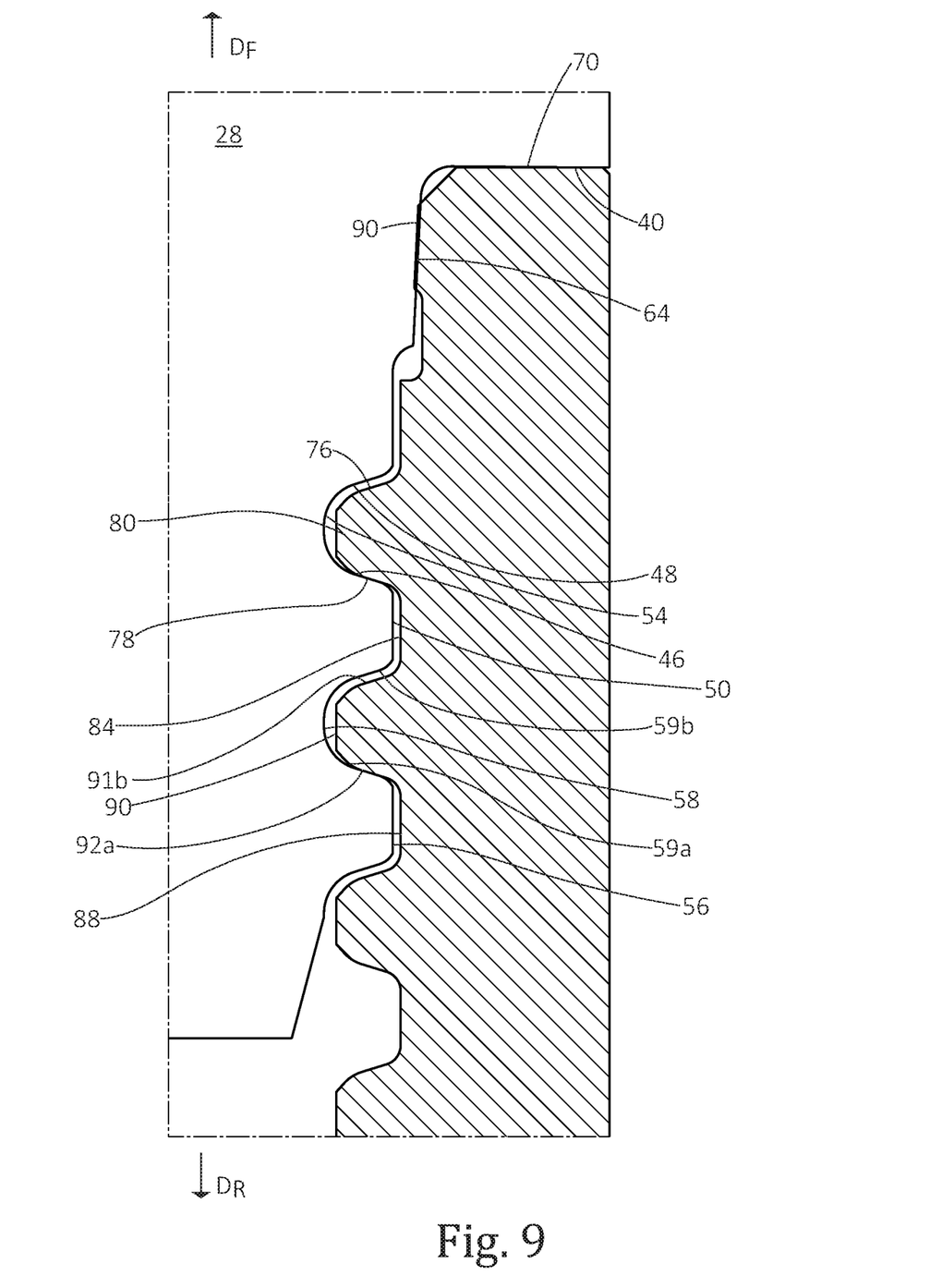
FIG. 9 is a detail of the longitudinal cross-sectional view of the rotary cutting tool shown in FIG. 1, when the rotary cutting tool is in a locked position.

In the locked position the male coupling member 38 is removably retained in the female coupling member 68. Also, the external and internal threads 42, 72 threadingly engage each other. Referring now to FIG. 9, the forward head abutment surface 64 abuts the forward holder abutment surface 94. In accordance with some embodiments of the subject matter of the present application, the rearwardly facing head base surface 40 can abut the forwardly facing holder forward surface 70. The rearward internal flank surface 78 can abut the forward external flank surface 46. The forward internal flank surface 76 can be spaced apart from the rearward external flank surface 48. The internal top surface 80 can be spaced apart from the external bottom surface 54. The internal bottom surface 84 can be spaced apart from the external top surface 50. By virtue of the foregoing, in a cross-sectional view taken in an axial plane containing the longitudinal axis L, each of the internal loaded surfaces 91a abuts a respective external loaded surface 59a. Each of the internal non-loaded surfaces 91b is spaced apart from a respective external non-loaded surface 59b. Each internal thread crest 88 is spaced apart from a respective external thread root 58. Each internal thread root 90 is spaced apart from a respective external thread crest 56.

Although the subject matter of the present application has been described to a certain degree of particularity, it should be understood that various alterations and modifications could be made without departing from the spirit or scope of the invention as hereinafter claimed.

What is claimed is:

1. A replaceable cutting head (22), having a head longitudinal axis (A) extending in a forward ($D_F$) to rearward direction ($D_R$), comprising a forward portion forming a cutting portion (26) comprising at least one cutting edge (30); and a rearward portion forming a mounting portion (28), the mounting portion (28) comprising a male coupling member (38) having an external thread (42) and protruding rearwardly from a head base surface (40), the head base surface (40) extending transversely with respect to the head longitudinal axis (A), and defining a boundary between the cutting portion (26) and the mounting portion (28), wherein:

the external thread (42) comprises an external thread ridge (44) extending helically about an external thread axis (B) and comprising forward and rearward external flank surfaces (46, 48) and an external top surface (50) extending therebetween;

the forward and rearward external flank surfaces (46, 48) generally face in opposite axial directions ($D_F$, $D_R$) and delimit a helical external thread groove (52) that comprises an external bottom surface (54);

the external thread (42) has a constant external thread pitch PE;

the external thread (42) has a constant external thread height $H_E$;

the external thread (42) of the male coupling member (38) is a straight thread defined by external inner and outer cylinders (EC1, EC2), the external inner cylinder (EC1) having a minor thread diameter $d_2$ and the external outer cylinder (EC2) having a major thread diameter $d_1$; and in a cross-sectional view taken in an axial plane containing the external thread axis (B):

the forward and rearward external flank surfaces (46, 48) form a plurality of straight external loaded surfaces (59a) and a plurality of external non-loaded surfaces (59b) respectively;

the external bottom surface (54) forms a plurality of concavely curved external thread roots (58), each external thread root (58) extending between first and second external root points (P1, P2) and merging with a respective external loaded surface (59a) at the first external root point (P1), the first external root point (P1) is spaced apart from the external inner cylinder (EC1) by a first external radial distance ERD1; and the first external radial distance ERD1 is greater than a third of the external thread height $H_E$ and less than two thirds of the external thread height $H_E$.

2. The replaceable cutting head (22) according to claim 1, wherein the first external radial distance ERD1 is greater than five twelfths of the external thread height $H_E$ and less than seven twelfths of the external thread height $H_E$.

3. The replaceable cutting head (22) according to claim 1, wherein:
each external loaded surface (59a) has an external loaded surface length L1 measured along contour thereof; and
each external thread root (58) has an external thread root length L2 measured along the contour thereof between the first and second external root points (P1, P2); and
the external thread root length L2 is between three and six times greater than the external loaded surface length L1.

4. The replaceable cutting head (22) according to claim 1, wherein the minor thread diameter $d_2$ is at least 75% of the major thread diameter $d_1$.

5. The replaceable cutting head (22) according to claim 1, wherein the external thread (42) has between three and four turns in the axial direction.

6. The replaceable cutting head (22) according to claim 1, wherein the external thread (42) is a single start thread.

7. The replaceable cutting head (22) according to claim 1, wherein the external thread height $H_E$ is greater than a third of the external thread pitch PE and less than half of the external thread pitch PE.

8. The replaceable cutting head (22) according to claim 1, wherein each external thread root (58) is defined by a single external root radius R.

9. The replaceable cutting head (22) according to claim 8, wherein the external root radius R is greater than or equal to 0.3 mm and less than or equal to 0.5 mm.

10. The replaceable cutting head (22) according to claim 8, wherein:
the first and second external root points (P1, P2) subtend an external root subtend angle θ at the circle center (O) of an imaginary circle defined by the external root radius R; and
the external root subtend angle θ is greater than or equal to 90° and less than or equal to 160°.

11. The replaceable cutting head (22) according to claim 10, wherein:
the external non-loaded surfaces (59b) are straight;
each external thread root (58) merges tangentially with a respective external non-loaded surface (59b) at the second external root point (P2); and
the external root subtend angle θ is greater than or equal to 120° and less than or equal to 140°.

12. The replaceable cutting head (22) according to claim 8, wherein the external root radius R is greater than a third of the external thread pitch PE and less than half of the external thread pitch PE.

13. The replaceable cutting head (22) according to claim 1, wherein each external thread root (58) merges tangentially with the respective external loaded surface (59a).

14. The replaceable cutting head (22) according to claim 1, wherein each external thread root (58) merges with a respective external non-loaded surface (59b) at the second external root point (P2).

15. The replaceable cutting head (22) according to claim 14, wherein the external non-loaded surfaces (59b) are straight.

16. The replaceable cutting head (22) according to claim 15, wherein each external thread root (58) merges tangentially with the respective external non-loaded surface (59b).

17. The replaceable cutting head (22) according to claim 1, wherein the first and second external root points (P1, P2) are spaced apart in an axial direction by a point distance d, the point distance d being greater than a third of the external thread pitch PE and less than half of the external thread pitch PE.

18. The replaceable cutting head (22) according to claim 1, wherein:
the external loaded surfaces (59a) are inclined at an external flank angle α with respect to a head radial plane (RP1) perpendicular to the external thread axis (B); and
the external flank angle α is in the range of 28°<α<34°.

19. The replaceable cutting head (22) according to claim 1, wherein in said cross-sectional view taken in an axial plane containing the external thread axis (B):
the external top surface (50) forms a plurality of external thread crests (56) each comprising a radially outermost external crest surface (61a), the radially outermost external crest surfaces (61a) being parallel to the external thread axis (B) and co-linear with each other.

20. The replaceable cutting head (22) according to claim 1, wherein in said cross-sectional view taken in an axial plane containing the external thread axis (B):
each straight external loaded surface (59a) has an external loaded surface height $H_S$ measured perpendicular to the external thread axis (B); and
the external loaded surface height $H_S$ is greater than a third of the external thread height $H_E$ and less than three-fifths of the external thread height $H_E$.

21. A rotary cutting tool (20) having a longitudinal axis (L) and extending in a forward ($D_F$) to rearward direction ($D_R$), comprising:
a tool holder (24) having a holder longitudinal axis (C) and a replaceable cutting head (22) in accordance with claim 1 threadingly engaged to the tool holder (24).

22. The rotary cutting tool (20) according to claim 21, wherein:
the replaceable cutting head (22) is made from a first material;
the tool holder (24) is made from a second material; and
the first material is harder than the second material.

23. The rotary cutting tool (20) according to claim 21, wherein:
the tool holder (24) has a female coupling member (68) having an internal thread (72) extending rearwardly from a holder forward surface (70), the holder forward surface (70) extending transversely with respect to the holder longitudinal axis (C); and
the rotary cutting tool (20) is adjustable between:
a released position in which the internal and external threads (42, 72) are not threadingly engaged to one another, and
a locked position in which the male coupling member (38) is removably retained in the female coupling member (68) with the internal and external threads (42, 72) threadingly engaged to one another.

24. The rotary cutting tool (20) according to claim 23, wherein the internal thread (72) of the female coupling member (68) is a straight thread defined by internal inner and outer cylinders (IC1, IC2).

25. The rotary cutting tool (20) according to claim 23, wherein:

the internal thread (72) comprises an internal thread ridge (74), extending helically about an internal thread axis (D), and comprising forward and rearward internal flank surfaces (76, 78) and an internal top surface (80) extending therebetween;

the forward and rearward internal flank surfaces (76, 78) generally face in opposite axial directions ($D_F$, $D_R$) and delimit a helical internal thread groove (82) that comprises an internal bottom surface (84); and the forward external flank surface (46) and the forward internal flank surface (76) face in the forward direction ($D_F$);

the rearward external flank surface (48) and the rearward internal flank surface (78) face in the rearward direction ($D_R$); and in the locked position, the rearward internal flank surface (78) abuts the forward external flank surface (46).

26. The rotary cutting tool (20) according to claim 25, wherein the internal thread (72) has a constant internal thread pitch (PI) which is the same as the external thread pitch (PE).

27. The rotary cutting tool (20) according to claim 25, wherein in the locked position:
the forward internal flank surface (76) is spaced apart from the rearward external flank surface (48);
the internal top surface (80) is spaced apart from the external bottom surface (54); and
the internal bottom surface (84) is spaced apart from the external top surface (50).

28. The rotary cutting tool (20) according to claim 25, wherein in a cross-sectional view taken in an axial plane containing the internal thread axis (D):
the forward and rearward internal flank surfaces (76, 78) form a plurality of internal non-loaded surfaces (91b) and a plurality of internal loaded surfaces (91a) respectively, the internal loaded surfaces (91a) being straight.

29. The rotary cutting tool (20) according to claim 25, wherein:
the internal top surface (80) forms a plurality of internal thread crests (88), each of the plurality of internal thread crests (88) comprising a radially innermost internal crest surface (96a) which is parallel to the internal thread axis (D), the radially innermost internal crest surfaces (96a) being co-linear with each other.

30. The rotary cutting tool (20) according to claim 29, wherein:
each of the plurality of internal thread crests (88) comprises a relieved internal crest surface (98) extending between a respective radially innermost internal crest surface (96a) and a respective internal loaded surface (91a); and
each relieved internal crest surface (98) is oriented transversely with respect to the respective radially innermost internal crest surface (96a) and the respective internal loaded surface (91a).

* * * * *